(12) United States Patent
Abbe et al.

(10) Patent No.: US 6,314,401 B1
(45) Date of Patent: Nov. 6, 2001

(54) MOBILE VOICE VERIFICATION SYSTEM

(75) Inventors: Stephen T. Abbe, Liverpool; Scott Leonard, Clinton; Fritz Schlereth, Syracuse; William Keiser, New Hartford; Barry Schlereth, Syracuse, all of NY (US)

(73) Assignee: New York State Technology Enterprise Corporation, Rome, NY (US)

( * ) Notice: Subject to any disclaimer, the term of this patent is extended or adjusted under 35 U.S.C. 154(b) by 0 days.

(21) Appl. No.: 09/322,626

(22) Filed: May 28, 1999

Related U.S. Application Data

(60) Provisional application No. 60/087,225, filed on May 29, 1998.

(51) Int. Cl.[7] ................................................. G10L 17/00
(52) U.S. Cl. ........................................... 704/273; 704/272
(58) Field of Search ...................................... 704/275, 270, 704/272, 273, 274, 201, 200.1, 200, 251

(56) References Cited

U.S. PATENT DOCUMENTS

| | | | |
|---|---|---|---|
| 5,214,707 | * | 5/1993 | Fujimoto et al. ..................... 704/275 |
| 5,706,399 | * | 1/1998 | Bareis ................................. 704/274 |
| 5,774,858 | * | 6/1998 | Taubkin et al. ....................... 704/273 |
| 5,832,440 | * | 11/1998 | Woodbridge et al. ................ 704/275 |
| 5,901,246 | * | 5/1999 | Hoffberg et al. ..................... 382/209 |
| 6,195,568 | * | 2/2001 | Irvin ..................................... 455/563 |

\* cited by examiner

*Primary Examiner*—Richemond Dorvil
(74) *Attorney, Agent, or Firm*—George R. McGuire; Hancock & Estabrook, LLP

(57) ABSTRACT

The present invention generally includes three principal components; namely, (1) a hand held transceiver for transmitting a voice pattern while moving (e.g., driving) past an (2) infra-red receiver array which receives the transmitted voice pattern, and a (3) speech enhancement and voice verification algorithm for conducting a comparison between the transmitted voice pattern and the registered voice patterns stored in the computer's memory. The hand held transceiver includes a conventional telephone handset in which a microphone subassembly, a transceiver circuit card, and LED indicators are housed. The transceiver element, also housed in the handset, includes a 16-bit analog to digital converter for converting the analog voice pattern to a corresponding digital signal, a microprocessor, a memory unit for storing the digitized voice sample for a predetermined period of time, and an IR transceiver for transmitting the digitized voice sample. Once a voice sample is digitized in the hand held transceiver, the individual may point the transceiver at a receiver array station which is housed in a cabinet, and after receiving a prompt from the receiver array, the voice signal, among other things, will be automatically, wirelessly transmitted. The processing computer will first recognize the spoken phrase, and then perform speaker verification using speech processing and comparing algorithms consisting of a speech recognizer and a vector quantification software classifier, ultimately sending a "pass" or "fail" signal to a control center computer based upon whether the speaker's voice pattern matches one of the voice samples stored in the computer's memory, respectively.

17 Claims, 15 Drawing Sheets

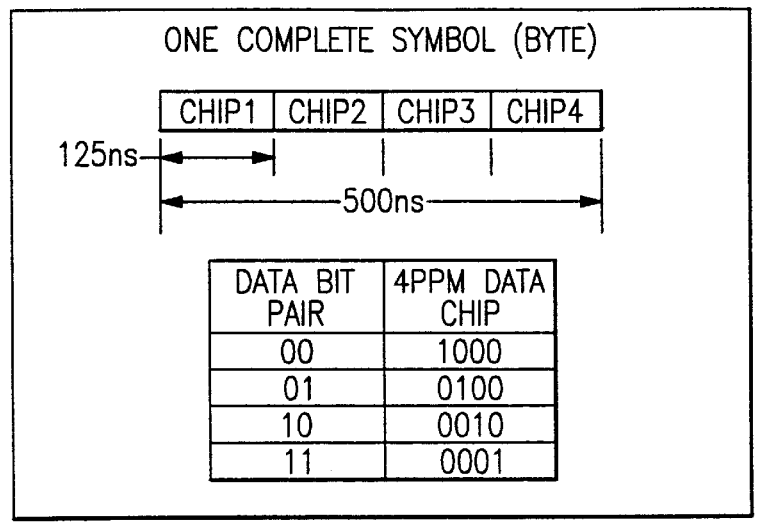
FIG.3
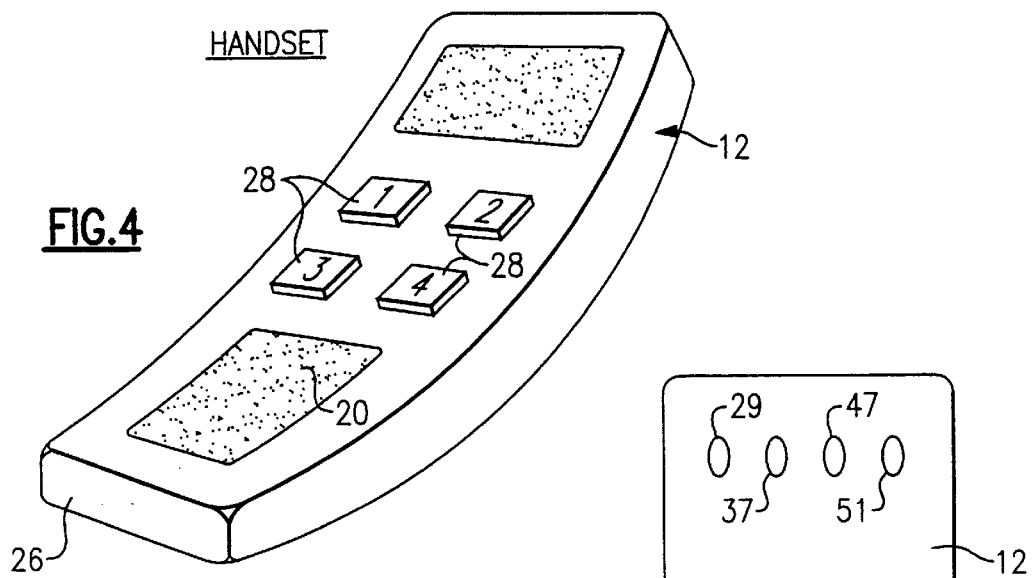
FIG.4
FIG.5

HHT BLOCK DIAGRAM

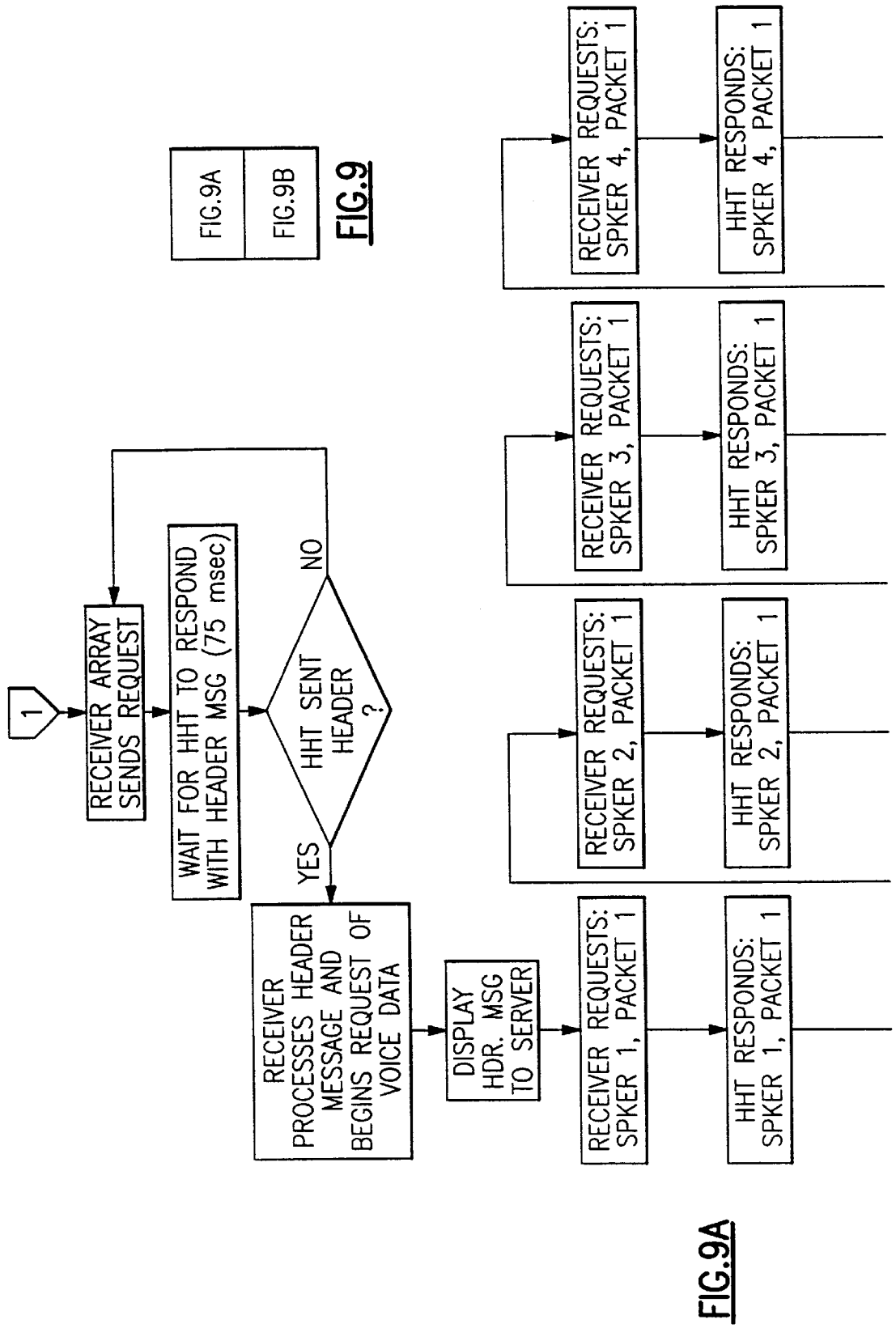

RECEIVER ELEMENT (RECEIVER ARRAY CABINET)

(MOUNTING RAIL)

(RECEIVER ARRAY)

(RECEIVER ARRAY)

MOBILE VOICE VERIFICATION SYSTEM

This application claims benefit to Provisional 60/087,225 filed May 29, 1998.

GOVERNMENT LICENSE RIGHTS

The United States government has a non-exclusive, royalty free license in this invention as provided for by the terms of the Partnership Intermediary Agreement delineated in the Memorandum of Understanding MOU No. F30602-96-3-0074 awarded by the United States Air Force at Rome Laboratories.

BACKGROUND OF THE INVENTION

The present invention generally relates to biometric security systems, and more particularly to a mobile verification system to be used by an individual, while in motion, to gain access to a secured area on the basis of that individual's unique voice pattern.

Biometrics

Biometrics involves the use of technology to identify individuals based on certain physiological or behavioral characteristics essentially unique to each individual. Examples of the most common characteristics manipulated through biometrics are finger print identification, voice verification, hand geometry, face geometry, and retinal and/or iris scans. Each of these forms of biometrics produce varying degrees of accurate identification and verification, as well as varying amounts of invasiveness to the individual. The choice of which biometric to implement is dependant primarily upon the level of security needed and the cost which may be incurred in implementation of a system.

In a security application, the biometric characteristic of individuals who will have access to the secure information or area are converted into digital signals and registered in a database stored in a computer's memory. When an individual desires to gain access to the secure information or area, he or she must interact with the particular biometric hardware so as to form a digital pattern of the characteristic and then transmit the characteristic from the hardware to the computer containing the registered database. An algorithm then conducts a comparison of the transmitted signal to those registered patterns stored in memory. If a match is found in the database, the individual is granted access.

Specific examples of existing biometric systems are as follows:

Voice Verification

A voice verification biometric system verifies an individual's identify by comparing an individual's live voice to stored voice samples. This type of system is different from voice identification technology, which is designed to identify the person who is speaking out of a database of known individuals. Furthermore, this system differs from speech recognition technology which is designed to understand the words spoken, regardless of the speaker. The biometric features used in comparing different voiceprints can include the base tones, nasal tones, larynx vibrations, cadence, pitch, tone, frequency, and duration of the voice. Because of the variety of features in the human voice, recordings and reproductions cannot deceive sophisticated voice verification systems.

The first step in using a voice verification biometric is to register the individual to be identified into the system. Most voice verification systems are currently text-dependent (i.e., the individual being identified is required to speak the same word or phrase every time), although there is a long-range trend in moving towards text-independent systems which would verify the individual regardless of what words are spoken. For text-dependent voice verification, the individual must repeat a specified password a number of times so that the system can be trained on different variations of the voice. The person's voiceprint is converted into digital signals and the features are extracted. The features are then fed to a pattern recognition classifier, such as neural network, which trains on the registered individual's features.

During verification, the individual's voice is again converted into a digital signal and the same voice features used in training are extracted. These features are then fed to the trained neural network, which "compares" them with the original features, and either accepts or rejects the individual.

The hardware needed for voice verification require only a computer to run the voice verification software, a microphone, voice filters, and an analog to digital converter to convert the inputted voice into a digital signal. Voice verification is also very simple to use, with the individual only needing to speak a password for verification. Also, it is non-intrusive and does not require the individual to touch or push anything.

It is possible to set up the voice verification system so that the neural network is trained on each new voice sample. This would enable the network to be consistent over time by passively updating the system as an individual's voice pattern changes.

The initial registration can be a time consuming process. It requires the user to repeat a password a number of times so that the neural network can be trained. The training of the neural network is a slow process, but it does not require any user input. While the training of the neural network is slow, the verification of a sample by the neural network can be done very quickly.

Voice verification is a fairly accurate system having a low false acceptance rate ("FAR") (although a somewhat higher false rejection rate ("FRR")). The higher FRR is the result of changes in a person's voice. A problem with voice verification is that a sore throat or laryngitis can result in an individual failing to be properly identified.

Fingerprint Identification

Fingerprint identification is commonly used by law enforcement and government agencies. It is one of the best understood and technologically advanced biometric verification methods. Fingerprints are very unique, with only a one in a billion chance of any two persons having the same fingerprint patterns.

Fingerprint identification works by first photographing the "swirls and whorls of each fingertip," and then converting this photograph into a digital image. A computer then takes this digital image and records the specific ridges, indentations and patterns (known as the characteristic points or minutiae) which are unique to each person. The international standard in fingerprint analysis requires the comparison of eight to twelve identical minutiae. By comparing the minutiae of the known fingerprint with the generated one, a computer can either verify or identify the person.

Fingerprint scanning equipment has an effective FAR of less than one percent and an FRR rating of three percent.

Hand Geometry

Hand geometry identification uses top plan views and side elevational views of a person's hand to identify the individual. A three-dimensional image of the length, width, and height of the hand and fingers are created using an optical scanner. Software then analyzes this image and compares information about the geometry of the hand to the database. Because only nine or ten bytes of information is stored, only a small database is needed to store information on persons in the system.

Hand geometry has the advantage of not having the negative connotation that fingerprinting does, and has been installed in over 7,000 places in America and Europe including airports, day care centers, nuclear research establishments and high-security government facilities. A major disadvantage of hand geometry is that is does not supply the same degree of security as other biometrics. Also, because the entire hand must be analyzed, hand geometry biometric readers are necessarily large devices. Hand injuries can also result in a failure to identify the individual.

Face Verification

Face verification biometric systems use an individual's face to verify his or her identity. Features on the face are used as landmarks for comparison to verify an individual. A neural network is used to compare the features of the individual to be identified with the features recorded in the database. A neural network is used because the data collected from subsequent images may be slightly different, and a neural network's robustness is able to compensate for changes in lighting, angle, size, or alterations in facial hair or glasses.

There are variety of different face verification algorithms. One of the most popular algorithms uses feature vectors from the face image as the biometric tokens. An eye localizer then determines the positions of the eyes in order to find meaningful feature vectors. Feature vectors are then created which contain images of the eyebrows, eyes, nose and mouth. These vectors are then inputted into the neural network to compare the current individual to the one stored in the database.

Another face verification algorithm uses the dimensions of the person's face and the distances between different features as the biometric token. Once again, these dimensions are inputted into the neural network to be compared against the original dimensions. This algorithm can also be used without a neural network (just like a fingerprint scan) because the geometry of the face is not likely to dramatically change over time.

Depending on the type of face verification algorithm used, the accuracy of the biometric can vary. In general, face recognition is more accurate than hand geometry, but not as accurate as fingerprints or eyes scans. For face recognition to be a viable technology for an in-vehicle access control system, there would have to be a way of getting an image of all of the occupants in the vehicles. While this might be possible for the driver (the driver, for instance, could stick her head out of the window and swipe a card through a reader) it would be more difficult for the other occupants of the car.

One major advantage of a face verification biometric is that pictures can be taken from farther away by existing and relatively inexpensive camera equipment. This system makes it unnecessary to transmit data from the vehicle to the receiving station. Another advantage of face verification is that physical contact or special code words are not needed. To be identified, a person need only look at the camera.

Eye Scan

Another possible biometric system uses the eye to verify the identity of an individual. Eye scans are presently the most accurate form of biometric identifier. There are two types of eyes scans: retina scans and iris scans. Retina scans work by scanning the back of the eyeball which contains a unique vascular pattern. For the individual to register or be verified by the system, she must look into a light which is position 1.5 to 2 inches away from the eye. Some of the light is reflected by the retina, and some of it is absorbed. The reflected light is collected by the reader and stored as the biometric token (approximately 192 data points are usually collected to identify the individual).

Although retina scanning is highly accurate, it has not received much use except for high-level security areas. This is mainly because people do not feel comfortable having a light shined into their eyes from a close range. Similarly, it would be very difficult to implement such a scanner for an in-vehicle access control system as a driver would be forced to place the scanner in front of her eye while driving in order for it to take a reading.

A less invasive eye biometric is an iris scan. Iris scans work by digitizing a highresolution picture of a person's iris as the biometric token. The iris is the colored portion of a person's eye which surrounds the pupil. An iris scan has the advantage of being taken from as far away as four feet, and bloodshot eyes and eye diseases such as glaucoma do not interfere with the scan. Although iris scans are very accurate, it would be very difficult to use the iris scans in a moving vehicle. If the car was stopped at the gate, an accurate iris scan could perhaps be done if the driver looked at the camera. This has the same drawbacks as other biometrics which require images of a person because the images must be gathered and analyzed while the car is moving, or during the moment that the driver swipes her card through the reader. It would therefore be very difficult to implement either a iris or retina scanning biometric into the in-vehicle access control system.

In-vehicle Access Control

Vehicle perimeter security is accomplished most often by having a security guard visually check the identification of a car's occupants, and, perhaps, an identification badge. Alternatively, a driver can swipe a magnetically encoded card through a reader to gain access. Typically, cameras provide additional security to monitor the secure area. Because each of these forms of verification require an individual to stop his or her car (and roll down the window) to gain access, they are relatively slow means of gaining access. In addition, they are subject to fraud and therefore are not highly reliable. Moreover, in locations with heavy traffic, but which require security measures, such as at international border crossings, the slowness of the conventional security measures is a hindrance to traffic flow.

It is therefore a principal object and advantage of the present invention to provide a biometric verification system that may be used by occupants of vehicles who desires to quickly gain access to a secure area.

It is another object and advantage of the present invention to provide an accurate verification system for use in high security applications.

It is a further object and advantage of the present invention to provide a non-intrusive, easy to use security system.

It is an additional object and advantage of the present invention to provide a verification system that may be actuated while driving or moving.

Other objects and advantages of the present invention will in part be obvious, and in part appear hereinafter.

SUMMARY OF THE INVENTION

In accordance with the foregoing objects and advantages, the present invention is generally comprised of three principal components; namely, (1) a hand held transceiver for transmitting a voice pattern while moving (e.g., driving) past an (2) infra-red receiver array which receives the transmitted voice pattern, and a (3) speech enhancement and voice verification algorithm for conducting a comparison between the transmitted voice pattern and the registered voice patterns stored in the computer's memory. Although one particularly good application of the present invention is to regulate border crossings, other perimeter access control applications are available; for example, warehouse depots into and out of which trucks continuously pass and parking structures needing heightened security and monitoring of the individuals entering the facility. Regardless of the application, the system operates in the same manner and is comprised of the same elements.

The hand held transceiver includes a conventional telephone handset in which a microphone subassembly, a transceiver circuit card, and LED indicators are housed. The microphone subassembly includes a circuit to regulate the 12 volts drawn off of a power source, such as a car's battery or a battery pack, down to 5 volts in order to power a conventional microphone, and a simple, high pass filter to reduce high noise gain in the 0–100 HZ and 4000 HZ and above ranges which operate collectively to collect the voice sample. The subassembly receives the spoken voice signal and outputs the signal to the transceiver to which it is electrically connected.

The transceiver element, also housed in the handset, includes a 16-bit analog to digital converter ("ADC") for converting the analog voice pattern to a corresponding digital signal, a microprocessor, a memory unit for storing the digitized voice sample for a predetermined period of time, and an IR transceiver for transmitting the digitized voice sample. Each of these elements are contained on a single micro controller card. A series of LEDs are connected to the card for indicating the status of the voice sample.

Also, a keypad is positioned on an external surface of the handset, with the user being able to selectively record a voice sample by pressing the appropriate button on the keypad. Once the button is pressed, the user will have a predetermined time in which to record the voice sample. At present, the transceiver can store up to four voice samples (e.g. four persons traveling in the same car). Each voice sample will remain in memory until transmitted to the IR array and/or for a predetermined time upon the expiration of which it will be automatically erased, whichever is sooner.

Once the voice sample is digitized in the hand held transceiver, the individual may point the transceiver at a receiver array station which is housed in a cabinet, and after receiving a prompt from the receiver array, the wireless (e.g., infra-red) transmission of the voice signal, among other things, will be automatically transmitted. The receiver station includes an array of IR (or other wireless) transceivers logically linked to one another, thereby permitting any one of the transceivers to receive the transmitted signal. The transceivers positioned on either end of the array are bent at predetermined angles to increase the width of the field in which a transmitted signal will be received. Once one of (or certain of) the transceivers in the array receives the signal, an automatic gain control (AGC) circuit will automatically adjust the gain of the transceiver to a level sufficient for transmission of the signal to a processing computer, also housed in the cabinet, to which the array is connected via a conventional (e.g., a PC/104 interface). The processing computer will first recognize the spoken phrase, and then perform speaker verification using speech processing and comparing algorithms consisting of a speech recognizer and a vector quantification software classifier. The processing computer then sends a "pass" or "fail" signal to a control center computer (via a RS232 protocol, or any other conventional protocol) based upon whether or not the speaker's voice pattern matches one of the voice samples stored in the computer's memory, respectively.

BRIEF DESCRIPTION OF THE DRAWINGS

The present invention will be further described and more fully understood by reading the following Detailed Description in conjunction with the accompanying drawings, wherein:

FIG. 3 is a table representing an example of how data is transmitted from the hand held transceiver to the receiver array of the present invention.

FIG. 4 is a perspective view of the hand held transceiver.

FIG. 5 is a rear elevational view of the hand held transceiver.

DETAILED DESCRIPTION

Figure 1:
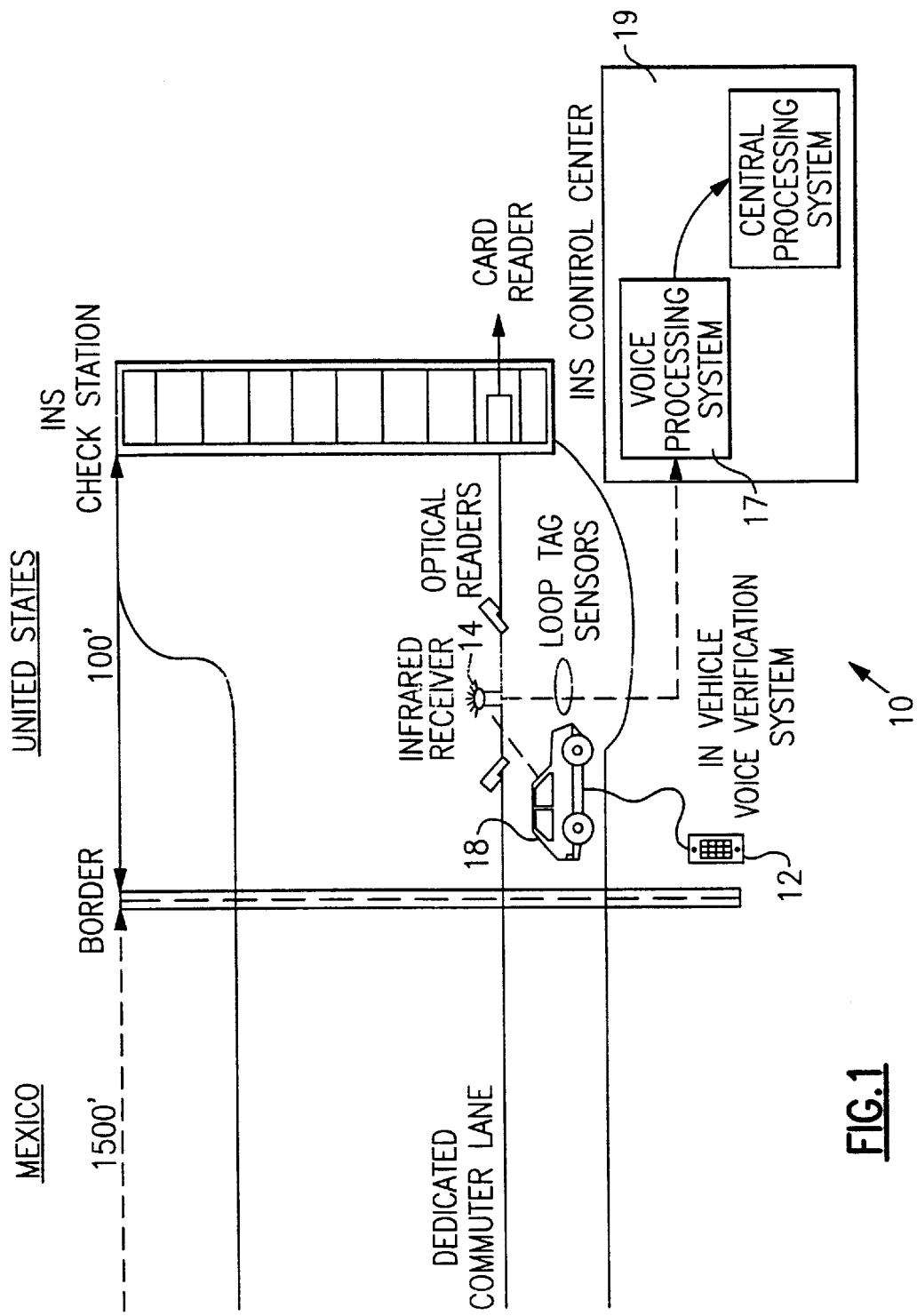
FIG. 1 is a representational view of the present invention employed in a border control application.
Figure 2:
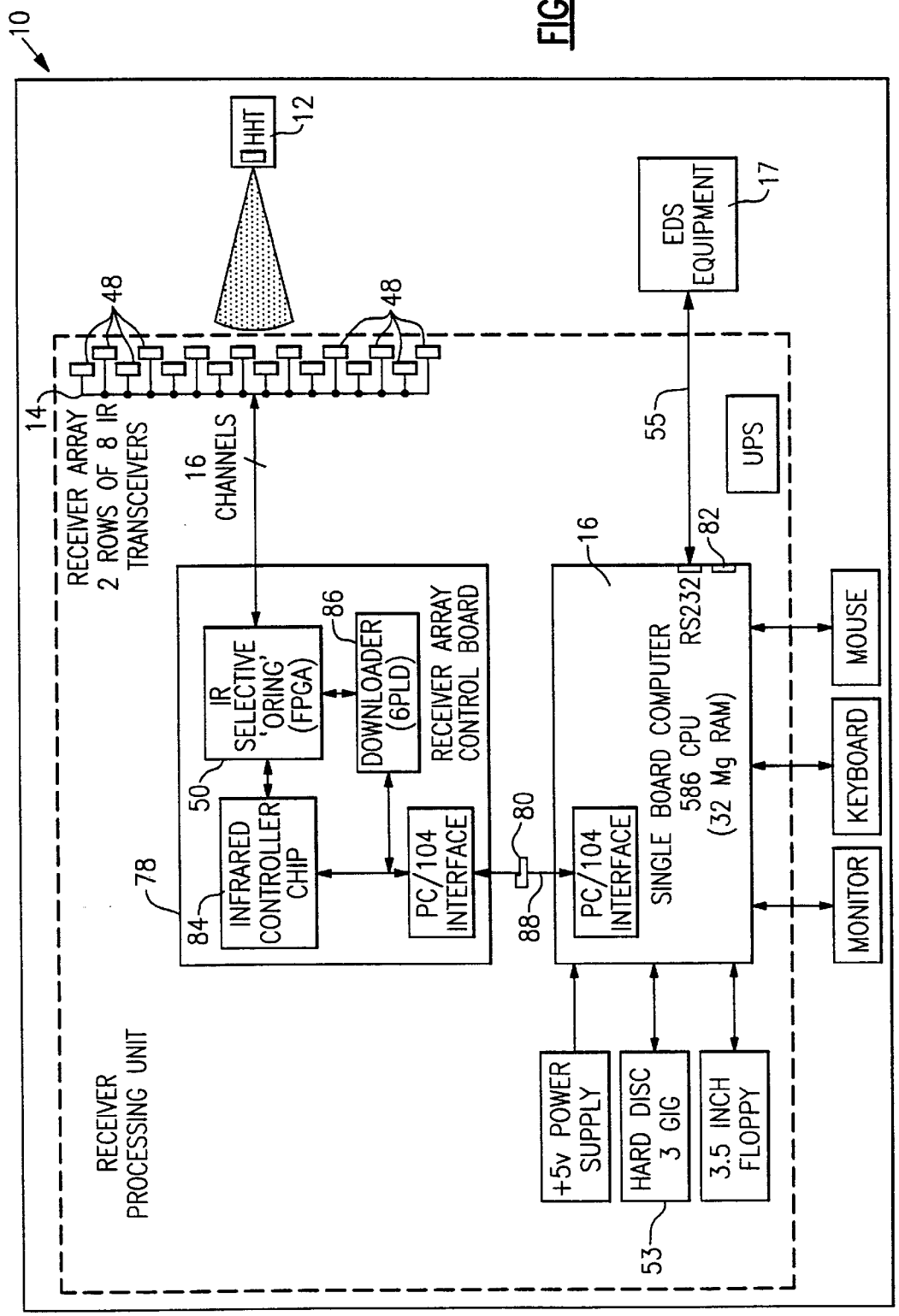
FIG. 2 is a block diagram of the present system.
Figure 6:
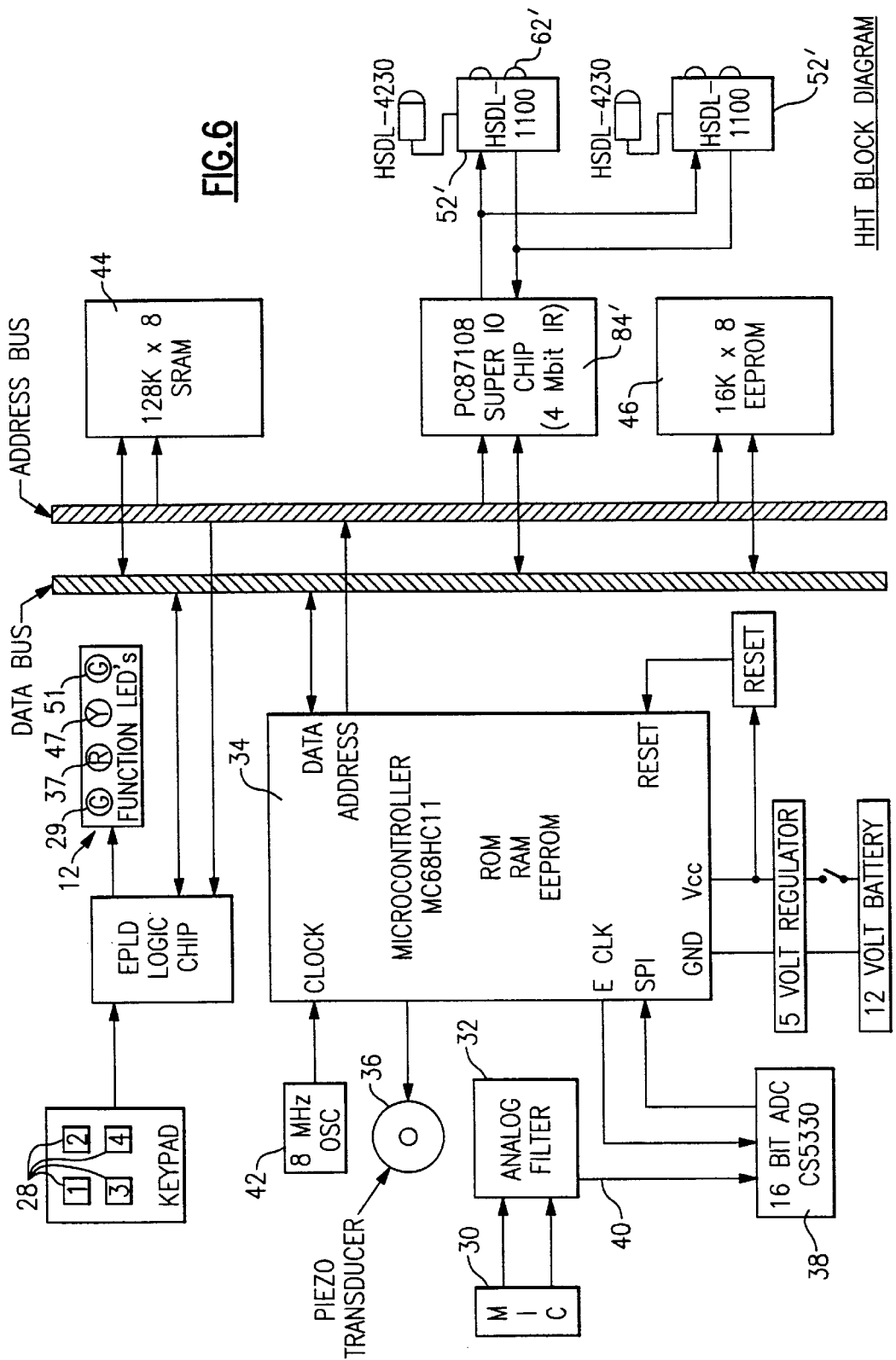
FIG. 6 is a block diagram of the hand held transceiver circuit board.
Figure 7:
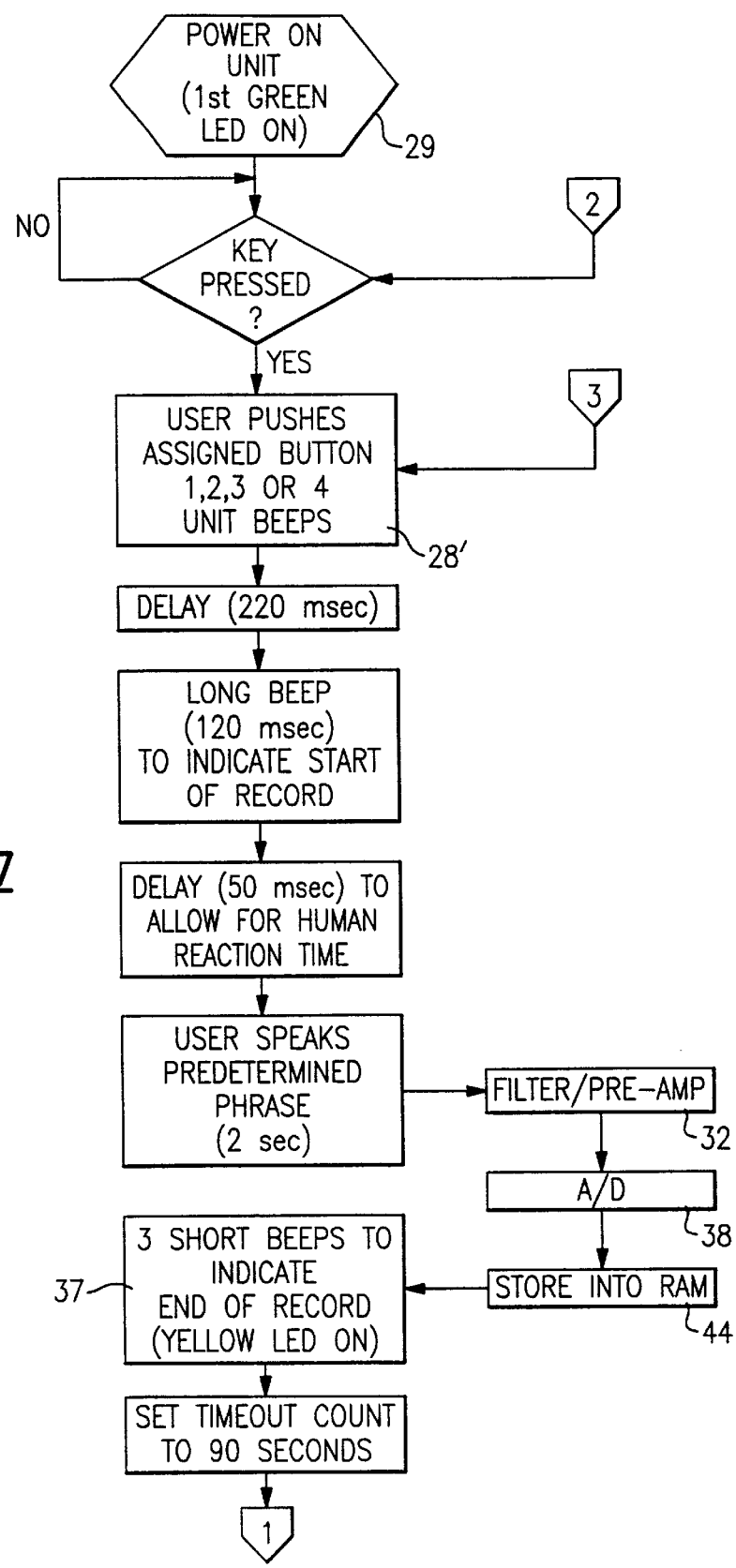
FIGS. 7–10 are flow charts illustrating the process by which the present invention operates.

Referring now to the drawings, wherein like reference numeral refer to like parts throughout, there is seen in FIGS. 1–2 a mobile, voice verification system, designated generally by reference numeral 10, particularly adapted to identify individuals traveling in a car. System 10 is generally and basically comprised of a hand held transceiver (HHT) 12, a wireless transceiver array, denoted generally by reference numeral 14, and a single board computer 16 electrically connected to transceiver array 14 via a conventional interface (e.g., a PC/104 interface). Generally stated, in operation, a user of system 10 records a voice sample into HHT 12 which then digitizes the voice sample and transmits it to transceiver array 14 and associated hardware (which will be discussed in greater detail hereinafter) which collects the sample and passes it to computer 16 which processes the sample and compares it to digitized voice samples stored in its memory (e.g., a hard drive of a computer 16). If the transmitted voice sample matches one of the voice samples stored in the memory of computer 16, a "pass" signal will be sent to a control computer 17 and access to an otherwise secure area will be granted to the individual. If no match is found, access will be denied until further investigation into the individual's identification has been determined. The "pass" or "fail" status will be transmitted from computer 16 to control center computer 17 via any conventional protocol (e.g., a RS232 protocol).

As a preferred application of system 10 is as an in-vehicle voice identification system for use in controlling access across borders, such as international borders as illustrated in FIG. 1. An individual riding in a car 18 may record his or her voice (saying a predetermined phrase) into HHT 12 while driving. While continuing to drive by transceiver array 14, the individual may point HHT 12 in the direct line of sight of array 14 and the two devices will wirelessly handshake, with the voice sample (which has been digitized in HHT 12) being transmitted to and received by transceiver array 14. Array 14 and its associated hardware will then send the data to computer 16 for processing and comparison to voice samples of registered individuals stored in its memory. The "pass/fail" message will be sent to control computer 17, and if a match is found, access across the border is granted, with the individual never having to stop his or her car.

With particular reference to FIGS. 4–7, HHT 12 is seen to be specifically comprised of a handset 26 having a plurality of buttons 28 (see FIG. 4) on an exterior surface thereof, and a microphone 30, filter 32 and microcontroller, designated generally by reference numeral 34, housed therein. In use, as a user is driving up to a check point, he or she would turn the power to the unit on (an LED 29 indicates power "on"), and then depress one of the "speaker" buttons 28. A short tone produced by a piezo transducer 36 will then sound, followed after a short delay by a longer tone, to alert the user that the unit is "ready" to receive a voice sample. The user would then speak a predetermined phrase (e.g. "nothing to declare") into handset 26 within a predetermined period of time (e.g., two seconds) at the expiration of which transducer 36 will emit a series of tones and an LED 37 will become actuated.

Microphone 30 receives the spoken phrase and outputs the analog voice signal to filter 32. Filter 32, which is a conventional, simple, high-pass filter, receives the analog signal and filters out the portion of the signal in the 0–100 HZ and 4000 HZ and above ranges. The filtered analog signal is then sent to a conventional, analog to digital converter (ADC) 38 via run 40. ADC 38 samples the analog signal at a predetermined rate determined by clock 42, and sends the sampled, digital signal in a serial format to chip 34 which then converts the signal into a parallel word of predetermined size (e.g., sixteen bits) and stores, in either an internal or external, conventional static random access memory (SRAM) 44.

As previously indicated, once the message is fully stored in SRAM 44, transducer 36 will generate a series of tones and an LED 37 actuates to indicate that the message has been recorded. If there are multiple occupants in the car each of whom need to verify their identity, then each speaker can record his or her voice sample in the same manner by beginning the recording process by pressing a button 28 unique to that individual. The voice sample(s) will remain in SRAM 44 for a predetermined period of time before being automatically erased.

If a user presses "speaker" button 28 and does not speak into handset 26 within the predetermined time (e.g., two seconds), HHT 12 will simply have recorded nothing into SRAM 44. In order to have a voice sample recorded, a user would have to once again depress "Speaker" button 28. The stored voice sample must then be transmitted, in a manner described hereinafter, within a predetermined period of time (e.g., ninety seconds), upon the expiration of which the sample will be erased from SRAM 44 and an LED 47 will turn on. The length of time in which a user has to record a voice sample, in addition to the length of time a recorded sample will remain in SRAM 44, are programmed into a conventional, electronically erasable read only memory (EEPROM) 46 which can be either external or internal to chip 34.

Figure 8:
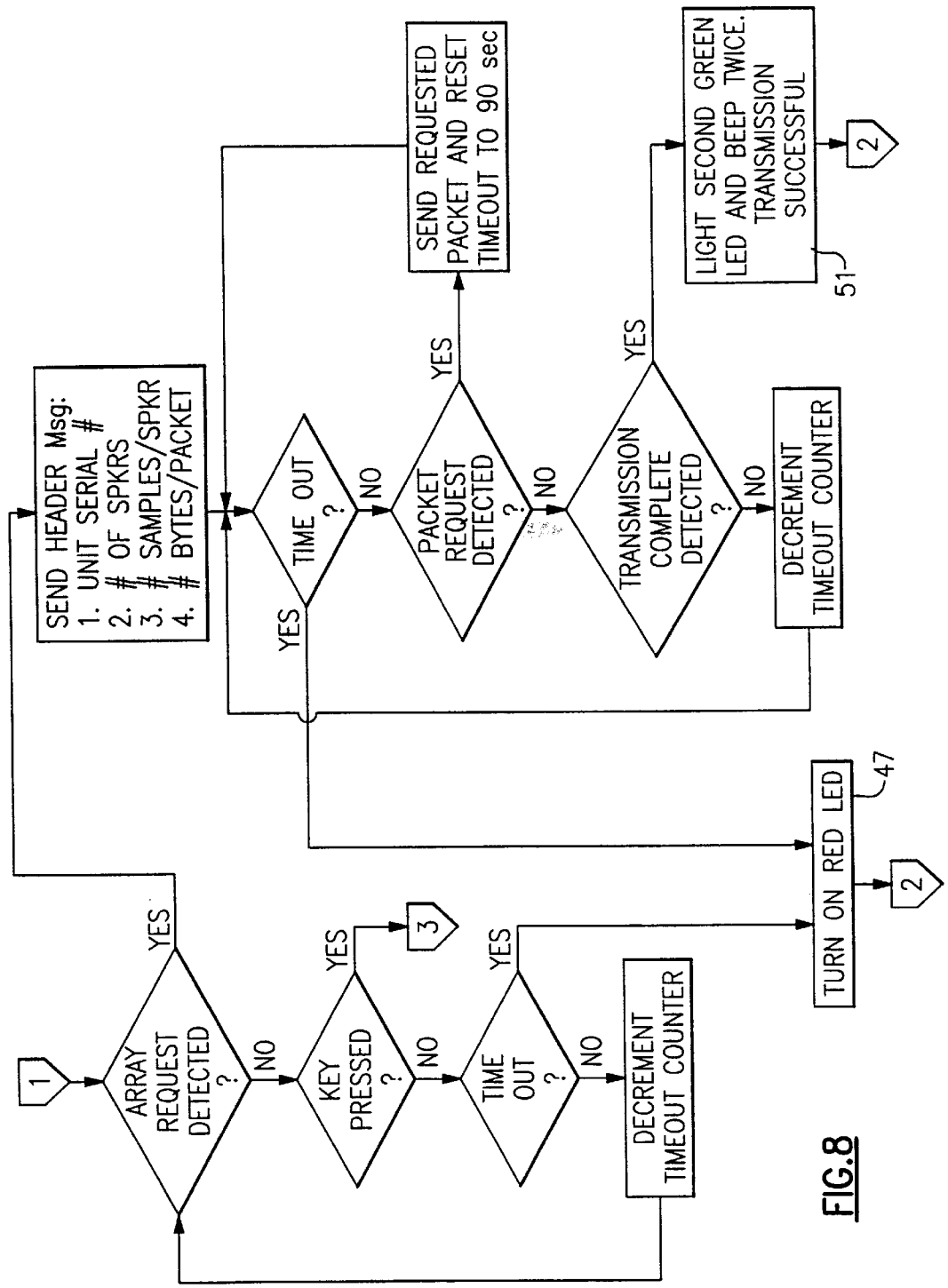
Figure 9B:
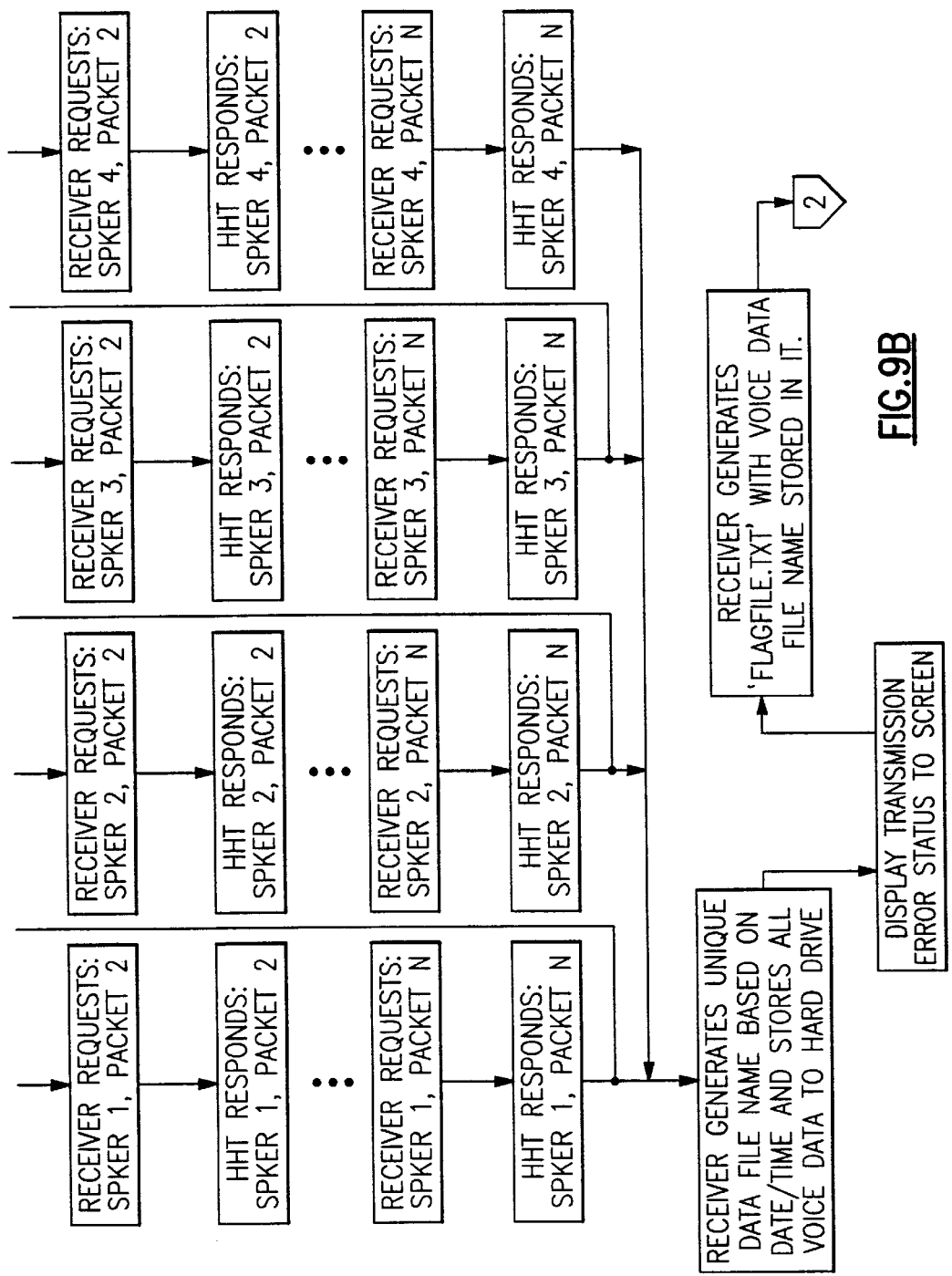

With reference to FIGS. 8–9, once each user has recorded their voice samples into HHT 12, it must be placed into the direct line of sight of transceiver array 14 within the predetermined time (e.g., ninety seconds). Array 14 and its associated hardware continuously transmit "request" pulses at a predetermined rate determined by a clock. When HHT 12 enters the field of view of array 14, and receives the "request" signal on its receive diode 62' (see FIG. 6), HHT 12 will then automatically transmit a predetermined header message which is partially stored in EEPROM 46 and partially stored in SRAM 44. The header message will contain predetermined data including the HHT's serial number (identifies the HHT), the number of speakers whose voice samples will be transmitted (i.e., the number of individuals who depressed separate "speaker" buttons 28), the number of samples per speaker and the number of bytes per packet. The number of speakers is stored in SRAM 44, while all other header elements are stored in EEPROM 46.

Once the header message is received by array 14 and its associated hardware and processed by computer 16, a request for voice samples is transmitted to HHT 12. In order to ensure an accurate and non-degraded transmission of the voice data, packets consisting of a predetermined number of bytes are individually transmitted by HHT 12. Therefore, the request for voice samples transmitted by array 14 "asks" for the packets in sequential order, e.g., speaker 1, packet 1; speaker 1, packet 2; etc. until all packets from speaker 1 are transmitted, at which time, speakers 2's packets will be requested, as is illustrated by the flow chart of FIG. 9.

Figure 10:
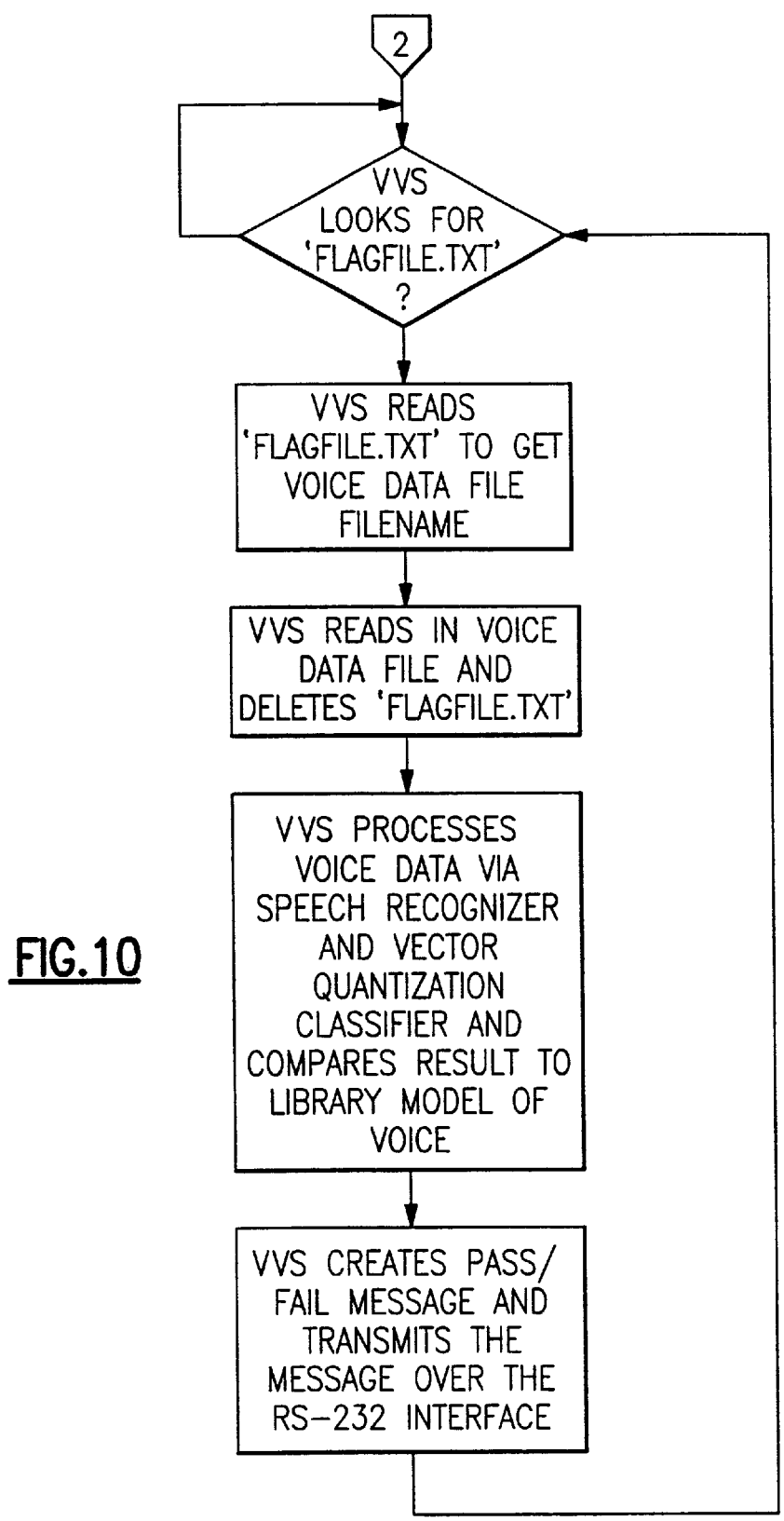
Figure 11:
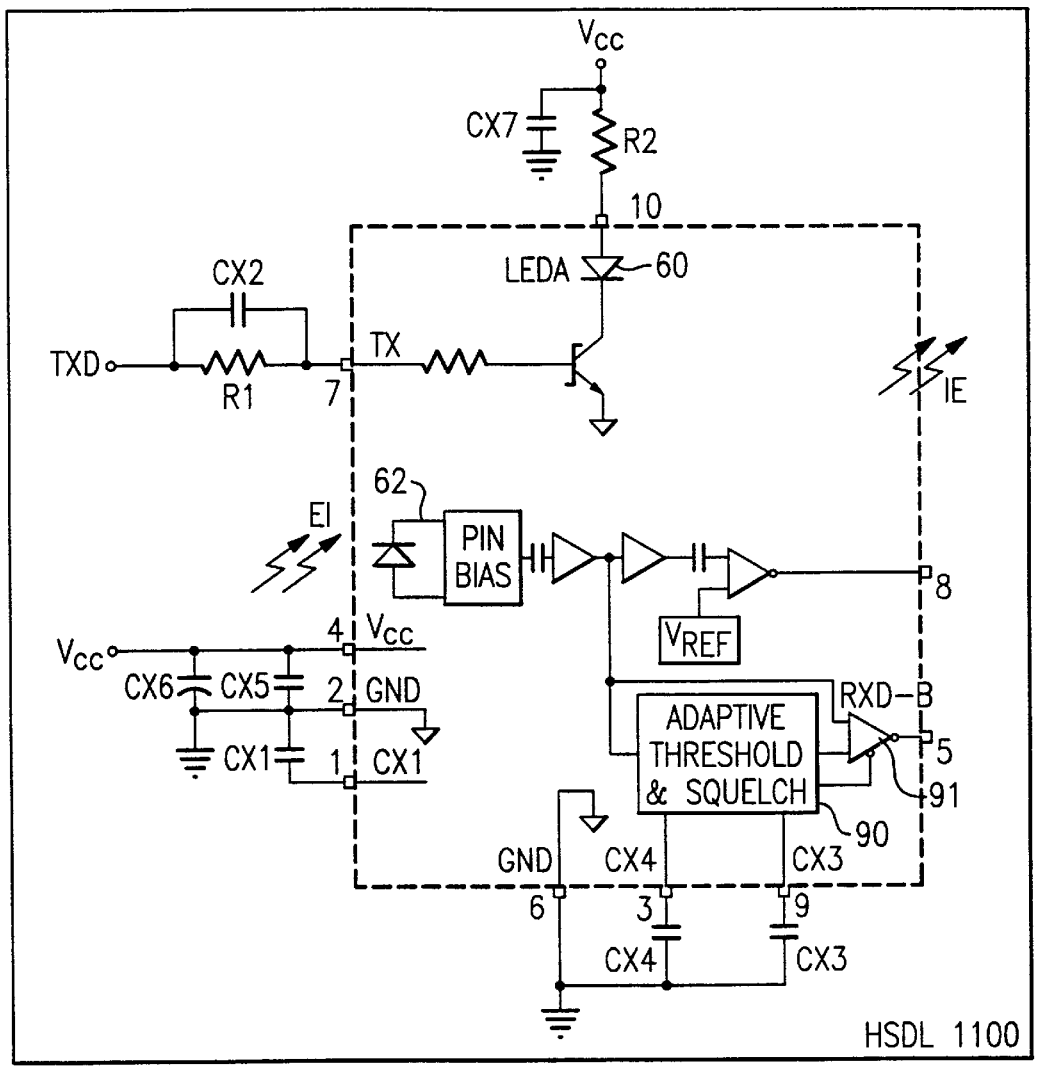
FIG. 11 is a schematic of the transceiver portion of the receiver array.
Figure 12:
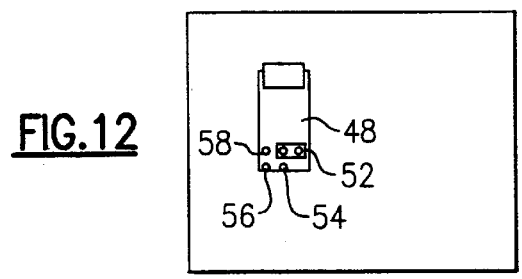
FIG. 12 is a representational block diagram of one element in the receiver array.
Figure 13:
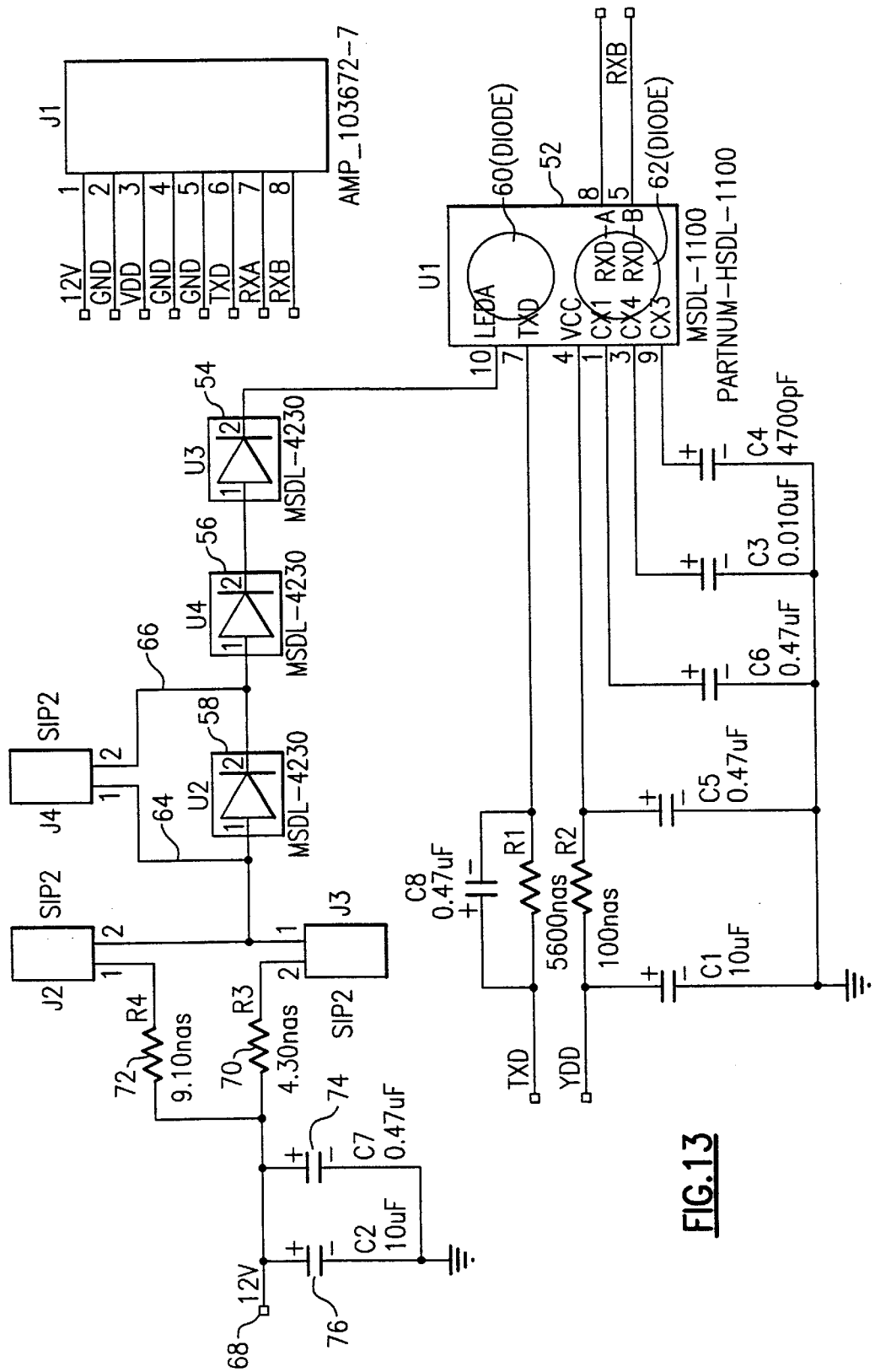
FIG. 13 is a schematic of one element in the receiver array.

Once all voice data is successfully transmitted from HHT 12 and received by array 14, a "transmission complete" signal will be transmitted from array 14 to HHT 12 and HHT 12 will activate LED 51 to turn "on," and transducer 36 will beep twice to indicate the successful transmission of data. As indicated in the flow chart of FIG. 9, after the successful transmission of all voice data is complete, computer 16 generates a unique data file name based on data/time and stores all voice data into hard drive 53 of computer 16. Once all the data is stored in the data file, computer 16 creates a flag file containing the name of the data file. The voice verification software (VVS) simultaneously running on computer 16 continuously "looks" for the flag file generated by computer 16 and stored on its hard drive. Once the flag file is found, the VVS reads in the voice data file and deletes the flag file, as is indicated by the flow chart of FIG. 10. The data is then processed by the VVS via voice enhancement algorithms. The processed data is then compared by the VVS to digitally processed voice samples stored as models in computer's 16 hard drive 53. If a match is found between the processed voice data and one of the voices stored in memory, a "pass" message is transmitted over a conventional interface 55 (e.g., RS232) leading to control computer 17. If no match is found, a "fail" message is transmitted over the same interface.

Array 14 is specifically comprised of a predetermined number (e.g., sixteen) of individual elements 48, all of which are logically linked to one another by a field programmable gate array ("FPGA") 50. Each element 48 is comprised of a circuit board having a conventional transceiver 52, such as the HSDL-1100 IR transceiver manufactured by Hewlett Packard, and a plurality, e.g., three, conventional, high powered, transmitters 54, 56 and 58, such as the HSDL-4230 IR transmitter manufactured by Hewlett Packard. Transceiver 52 is made up of a transmit diode 60 and a receive diode 62. Transmit diode 60 is electrically connected in series to transmitters 54, 56 and 58 so as to increase the transmission power (e.g., increase the distance over which a signal can be transmitted). Depending on the transmission distance needed, transmitter 58 can be jumped via leads 64 and 66, thereby decreasing the amount of power needed to transmit. In order to control the amount of power, the 12-volt power supply 68 is sent through either resistor 70 or resister 72, depending on whether transmitter 58 is jumped or utilized, respectively, to regulate the voltage down to a desired level. Capacitors 74 and 76 are used to reduce any power supply noise. Resistor 70 is, of course, less ohmic than resistor 72 due to the amount of voltage necessary to power the transmitters.

Single board computer 16 is used to control array 14 via a receiver control board 78 which interfaces with computer 16 via a standard interface, such as a PC/104 interface (computer 16 and receiver control board 78 are preferably, but not necessarily, designed in part to be the same size to facilitate this interface). Computer 16 can be controlled remotely via modem 80 running software such as PCANY-WHERE. The software run on computer 16 talks to and controls array 14 and its associated hardware through the PC/104 interface.

The hardware associated with array 14 is on a control board 78 which contains three basic chips, in the preferred embodiment; namely, a controller chip 84 (such as the PC87108 chip manufactured by National Semiconductor), a field programmable gate array (FPGA) 50, and an electronically programmable logic device (EPLD) 86. Controller chip 84 interfaces directly with the PC/104 bus 88 and is software programmable over this bus. Software messages sent to chip 84 from computer 16 are converted into a serial bit stream in, preferably, a standard 4 PPM (pulse position modulation) format and sent to FPGA 50 (see FIG. 3 for a table of the PPM standard). FPGA 50, in turn, fans this single signal out to each of the array elements 48 which transmit the message simultaneously (i.e., all array elements 48 will transmit the IR pulse at the same time). When an HHT 12 comes into range and receives a pulse from array 14, it then responds by sending its data.

When receive diode 62 receives a pulse of energy, it converts the pulse into a standard transistor-transistor logic ("TTL") level signal. The TTL signal is then decoded by controller chip 84. The pulses received by diode 62 are, of course, the header message and voice data packets transmitted by HHT 12.

Figure 14:
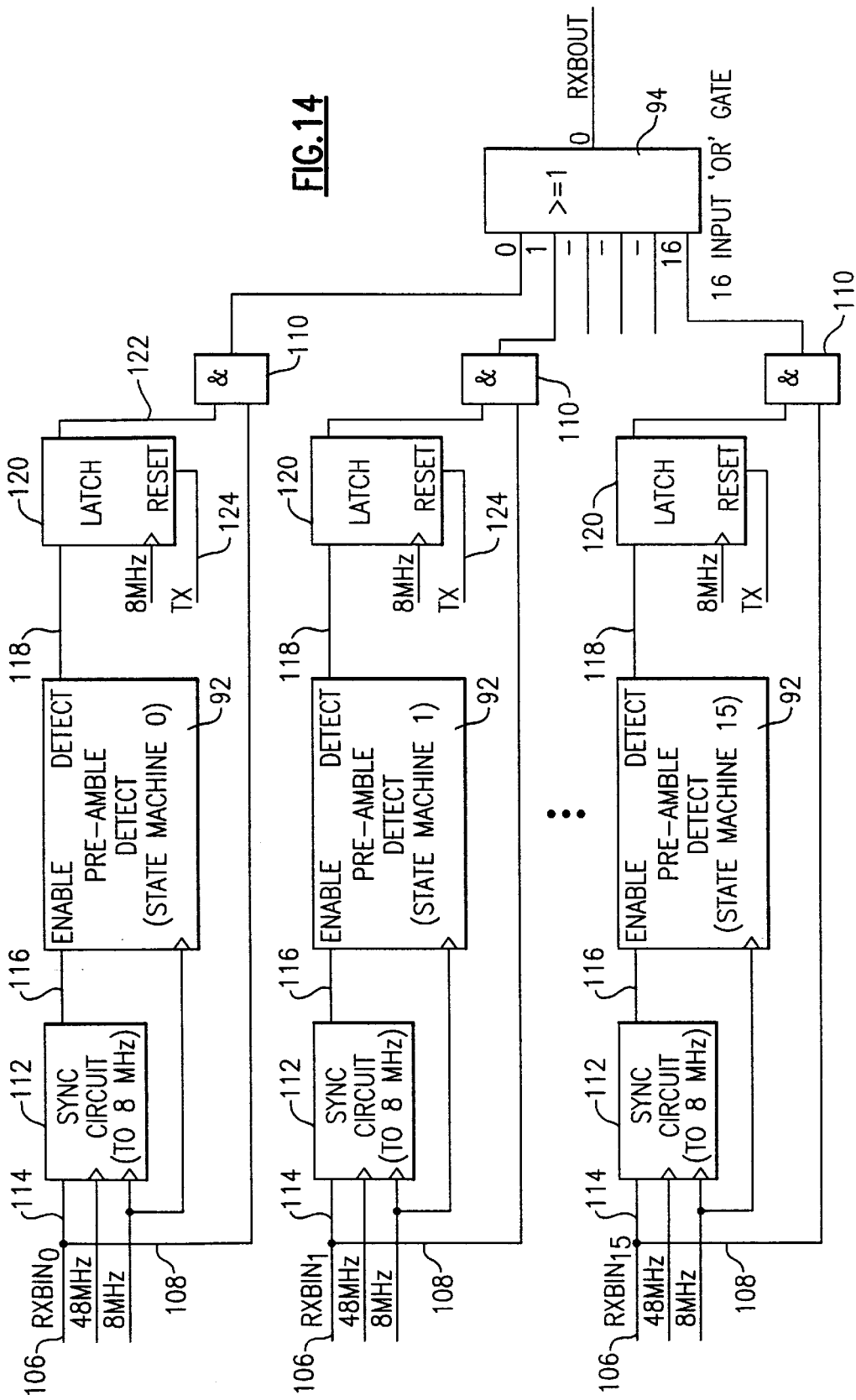
FIGS. 14–15 are block diagrams representing the logic interface between the array elements and the field programmable gate array.
Figure 15:
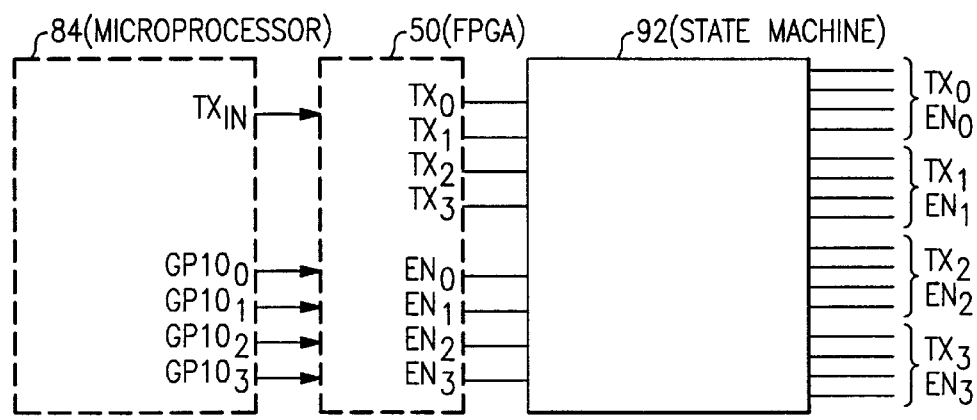
Figure 16:
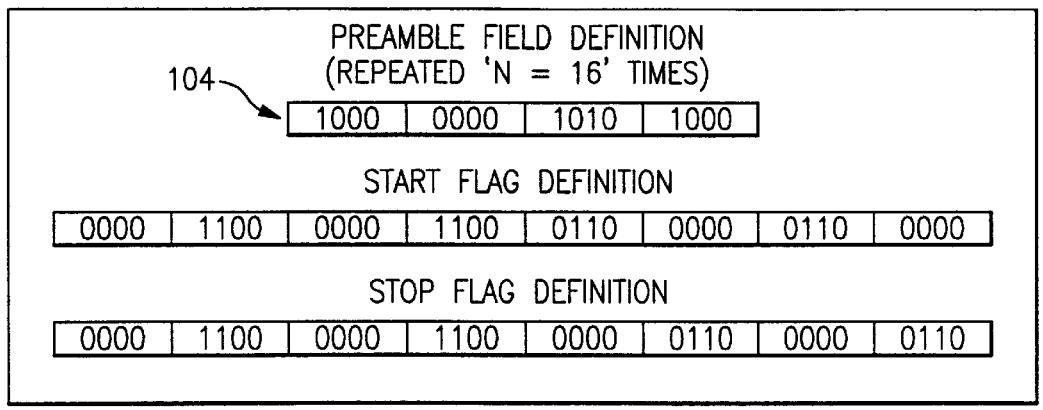
FIG. 16 is a representational block diagram illustrating an example preamble signal.
Figure 17:
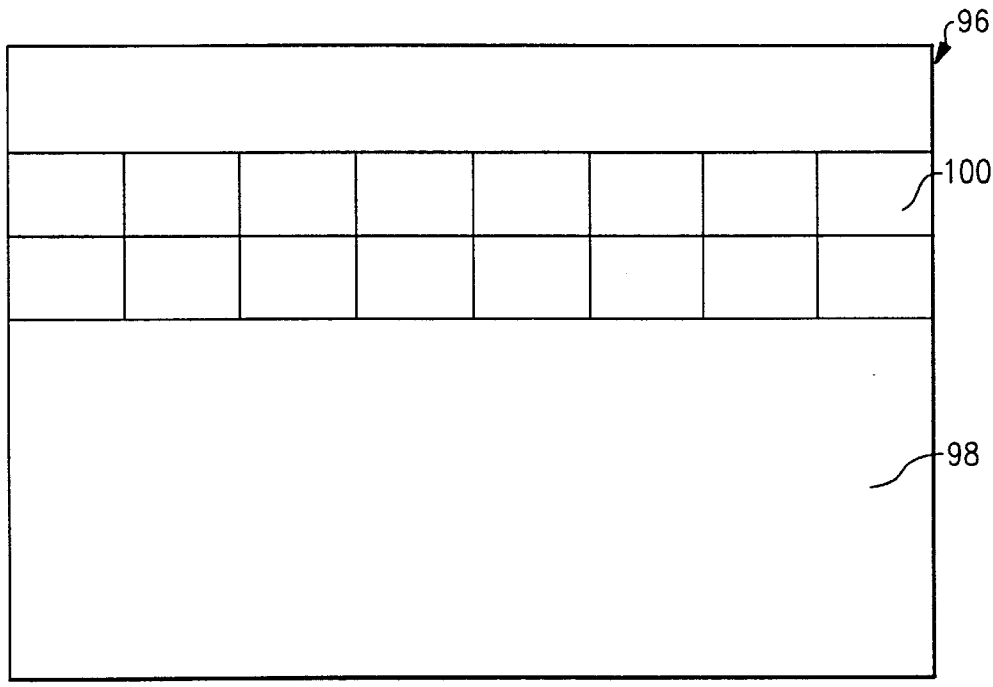
FIG. 17 is a front elevational view of the receiver array cabinet.

Upon reception of the pulses from an HHT 12 that has come within the array's field of view, only certain of the elements 48 will receive the signals at a fully detectable strength due to the HHT moving a certain rate of speed past the array while its transmitting. The detection of which array elements 48 have been fully energized is done by observing a preamble pattern consisting of a predetermined signal (e.g., two eight bit words) which is converted into light pulses where "1" is "on" and "0" is "off" (see FIG. 16) which is sent at the beginning of each frame of data sent by HHT 12. An automatic gain control circuit (AGC) 90 present in transceiver 52 adjusts the gain of receive diode 62 based upon receipt of the preamble and converts the IR signal to a TTL level signal at buffer 91. With particular reference to FIGS. 14 and 15, the circuitry which properly aligns the TTL signal with the onboard clock of controller 78, and ensures uncorrupted data, is illustrated. To determine which of array elements 48 has received good data, a predetermined preamble pattern 104 (see FIG. 16) is sent at the beginning of each frame of data transmitted from HHT 12. The preamble consists of the ERDA standard of four bits per packet, with each bit being sent at 8 MHz or 125 nSec. The entire frame of data (which consists of the preamble 104, start pattern 105, the data itself, the stop pattern 107, and a check sum) is received on an asynchronous RXB line 106 which sends the signal over line 108 directly to an AND gate 110. These signals, of course, toggle between high and low depending on the particular bit's state. The preamble signal itself is sent to a synch circuit 112, via line 114, which samples the signal down to the predetermined clock rate (e.g., 8 Mhz), which then sends the sampled signal to state machine 92, via line 116. State machine 92 looks at the signal received, and if it matches the predetermined bit pattern of preamble 104, it then sends a high signal over detect line 118 to a latch 120. Latch 120 will hold and continuously send the high signal over line 122 to AND gate 110 until it is automatically reset by transmit line 124 which requests new data after the full packet has been received from HHT 12. Accordingly, when a particular element receives a good signal, its state machine 92 will continuously send a high signal to AND gate 110, thereby making the output of AND gate 110 strictly dependent upon the data signal received over line 106.

The output from AND gate 110 is then sent over a line 122 to OR gate 94, which also receives the signals from the other AND gates. All of the signals received by OR gate 94 are then processed and a single output is sent to controller chip 84. Therefore, provided one array element 48 receives good data, and its preamble is verified by its state machine 92, the output from OR gate 94 will be uncorrupted. To ensure synchronicity in the handshaking process between HHT 12 and array 14, a corresponding controller chip 84' is incorporated into HHT 12 to interface with microcontroller 34 and transceivers 62'.

Figure 22:
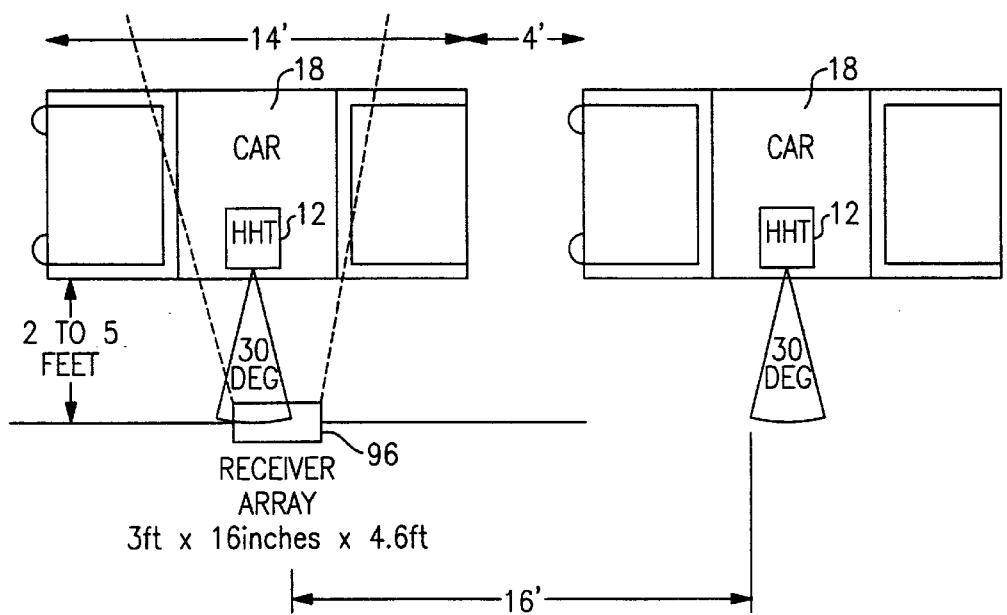
FIG. 22 is a representational diagram illustrating traffic flow past the receiver array.
Figure 18:
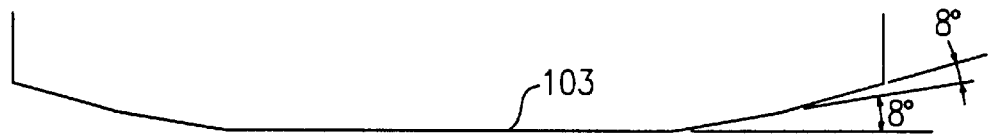
FIG. 18 is a top plan view of the receiver array mounting rail.
Figure 19:
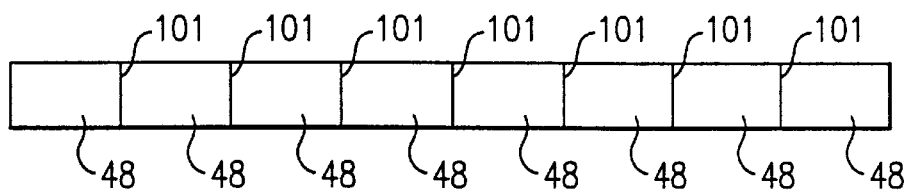
FIG. 19 is a front elevational view one level of the receiver array.
Figure 20:
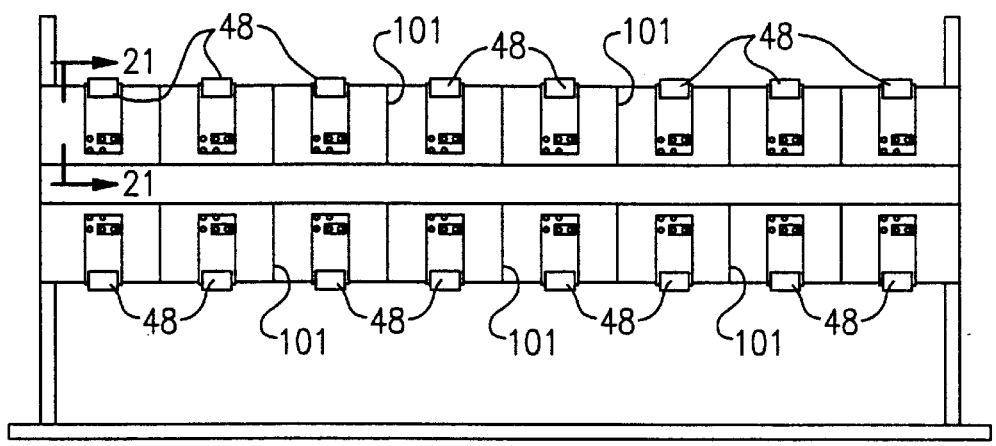
FIG. 20 is a front elevational view of the fully assembled receiver array, without the IR shield, and its mounting post.
Figure 21:
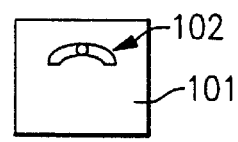
FIG. 21 is a cross-sectional view taken along line 21—21 of FIG. 20.

Structurally, receiver board 78, array 14, and computer 16 are all housed in a common cabinet 96. Cabinet 96 contains a front face 98 having a transparent shield 100 incorporated therein which permits array elements 48 to effectively transmit and receive signals. The array elements 48 are stacked in two equal rows and are attached to a railing 103 and spaced a predetermined distance apart by spacers 101, e.g., 3.75 inches apart in the preferred embodiment, with the last two elements on each end being bent at predetermined angles (see FIG. 18), e.g., 16 degrees and 8 degrees, respectively, in order to increase the viewing angle of array 14. Using conventional IR elements, transceivers 52 (on elements 48) have a predetermined beam width (30 degrees in the preferred embodiment), and the high powered transmitters 54, 56, and 58 have beam widths of about 17 degrees in the preferred embodiment. With these beam widths and spacing of elements 48, the desired volume in front of cabinet 96 is filled with pulses to achieve the desired transmission distance, as is illustrated in FIG. 22. In addition, each row of elements 48 can be tilted up or down via the curved slot 102 formed through the mounting post 104 (see FIG. 21) in order to activate different elevational coverages.

In order for system 10 to be functional, a group of individuals who desire to make use of it, must first become registered in the system. To do this, each individual must record their voice patterns a predetermined number of times into the data bank of computer 16. As the present system uses a series of voice verification algorithms which make use of a speech recognizer and a vector quantization classifier in order to perform a voice comparison and verification, and the system is text-dependent, a user must repeat a predetermined phrase a predetermined number of times. Each time the phrase is spoken, a feature extraction process is performed on the raw speech. The particular feature extraction is a process of transforming a signal and deriving a compact set of time varying parameters that are characteristic of that given signal. These parameters preserve information relevant to the signal and reduce the redundancy in its representation.

After the feature extraction process is completed, the features are fed into the speech recognizer and vector quantization classifier. The use of two algorithms produces more accurate results as each of them measures a different aspect of the speech. The results of the two classifiers are fused together to give a single, accurate verification score.

The speech recognizer is used to make sure that the speech spoken by the user is, in fact, the required pass phrase. This allows the spoken phrase to be used as a legal statement with an appropriate selection (e.g., "I have nothing to declare"). A conventional speech recognizer is used to accomplish this task. The returned score from this recognizer represents the closeness of a match to the required phrase.

The vector quantization classifier is used to determine the identity of the speaker. A classification score is computed from each speech utterance to verify that the speaker's identity matches that of the stored model. This classifier capitalizes on the fact that every person's vocal tract is different.

What is claimed is:

1. A system for verifying the identity of one or more passengers in a vehicle moving past a predetermined location, said system comprising:
   a) first transceiver means within said vehicle for wirelessly transmitting and receiving sequences of coded signals;
   b) second transceiver means positioned at said predetermined location for wirelessly transmitting and receiving sequences of coded signals to and from said first transceiver means;
   c) memory means containing a plurality of digitally stored signal groups each uniquely associated with the speech parameters in a predetermined message spoken by one of the individuals whose identity may be verified by said system;
   d) signal processing means within said first transceiver means for generating a sequence of digitized signals commensurate with the speech parameters in said message spoken by an occupant of said vehicle and for transmitting said sequence of digitized signals as one of said sequences of coded signals to said second transceiver means;
   e) comparator means for comparing said one of said sequences of coded signals received by said second transceiver means with each of said stored plurality of signal groups; and
   f) means for generating a pass signal in response to a predetermined degree of correspondence of said one of said sequence of coded signals with one of said stored plurality of signal groups.

2. The system of claim 1 wherein said first transceiver means comprises a hand held transceiver and said second transceiver means comprises a fixedly positioned array of infrared transceivers for receiving sequences of coded signals transmitted from said first transceiver means in a line-of-sight path to said infrared transceivers.

3. The system of claim 2 wherein said signal processing means include storage means for storing said sequence of digitized signals prior to transmission thereof in the form of said sequence of coded signals by said first transceiver means for reception by said second transceiver means.

4. The system of claim 3 wherein said storage means comprises a static random access memory.

5. The system of claim 3 wherein said first transceiver means includes a microphone and said storage means includes means for storing a plurality of groups of digitized signals corresponding respectively to speech parameters of said message when spoken a plurality of times into said microphone.

6. The system of claim 3 wherein said first transceiver means includes means for converting said sequence of digitized signals into a parallel word of predetermined length, said parallel word being transmitted by said first transceiver means as said sequence of coded signals.

7. The system of claim 6 wherein said second transceiver means continuously transmits a sequence of coded signals representing a request signal and said first transceiver means includes enabling means causing said first transceiver means to transmit a sequence of coded signals in response to receipt of said request signal.

8. The system of claim 7 and further including a clock connected to said second transceiver means to control the rate of transmissions of said request signal.

9. The system of claim 6 wherein said second transceiver means transmits a first sequence of said coded signals representing a first request signal and said first transceiver means includes first enabling means causing said first transceiver means to transmit a second sequence of said coded signals representing a header message containing predetermined data, said second transceiver means includes second enabling means causing said second transceiver means to transmit a third sequence of said coded signals representing a second request signal and said first transceiver means includes third enabling means causing said first transceiver means to transmit a fourth sequence of said coded signals corresponding to a sequence of said digitized signals commensurate with speech parameters.

10. The system of claim 9 wherein said comparator means includes a computer with voice verification software containing voice enhancement algorithms.

11. The system of claim 10 wherein said computer controls said array of infrared transceivers.

12. The system of claim 11 wherein said array of infrared transceivers comprises a plurality of individual devices having predetermined individual fields of view arranged in at least one horizontal row and spaced from one another by predetermined distances to provide a desired horizontal field of view for said array.

13. The system of claim 12 and further including mounting means for said array for selective adjustment of the vertical angle of view of said devices.

14. The method of verifying the identity of at least one individual in a moving vehicle who has authorization to pass a predetermined location without stopping the vehicle, said method comprising:

a) storing in first memory means outside said vehicle a first sequence of digitized signals commensurate with speech parameters of said individual in a first recitation of a predetermined message;

b) providing within said vehicle for use by said individual first transceiver means for wirelessly transmitting and receiving sequences of coded signals;

c) positioning substantially at said predetermined location second transceiver means for wirelessly transmitting and receiving sequences of coded signals;

d) storing in second memory means within said vehicle a second sequence of digitized signals commensurate with speech parameters of said individual in a second recitation of said message made while in said vehicle prior to arrival thereof at said predetermined location;

e) transmitting said second sequence of digitized signals by said first transceiver means from within said vehicle as the latter passes said second transceiver means;

f) receiving said second sequence of digitized signals by said second transceiver means;

g) comparing said second sequence of digitized signals with said first sequence of digitized signals; and h) generating a pass signal in response to a predetermined degree of correspondence of said first and second sequences of digitized signals.

15. The method of claim 14 wherein said second transceiver means comprises a plurality of infrared transceiver devices and comprising the additional step of mounting said devices in spaced relation to form an array of predetermined configuration.

16. The method of claim 15 and further including transmitting by said second transceiver means one of said sequences of coded signals and transmitting said second sequence of digitized signals by said first transceiver means in response to receipt thereof of said one of said sequence of coded signals.

17. The method of claim 16 and further including storing in said first memory means a plurality of first sequences of digitized signals each commensurate with speech parameters of a predetermined message in a first recitation thereof by a respective plurality of individuals each of whom has authorization to pass said location, storing in said second memory means second sequences of digitized signals commensurate with speech parameters of said message in a second recitation thereof by said plurality of individuals, each of whom is an occupant of said vehicle, and sequentially transmitting and receiving said second sequences of digitized signals by said first and second transceiver means, respectively, and comparing the respective sets of first and second digitized signals to determine correspondence thereof, thereby verifying identity of the occupants of said vehicle.

* * * * *